Dec. 24, 1968   F. D. JONES ET AL   3,417,556
TOBACCO HARVESTER

Filed Aug. 20, 1965   5 Sheets-Sheet 1

INVENTORS
FRANK D. JONES
GEORGE H. SHRIVER
ROY E. HARRINGTON
BY

*John C. Thompson*

ATTORNEY

Dec. 24, 1968   F. D. JONES ET AL   3,417,556
TOBACCO HARVESTER

Filed Aug. 20, 1965   5 Sheets-Sheet 2

INVENTORS
FRANK D. JONES
GEORGE H. SHRIVER
ROY E. HARRINGTON
BY
John C. Thompson
ATTORNEY Dec. 24, 1968  F. D. JONES ET AL  3,417,556
TOBACCO HARVESTER
Filed Aug. 20, 1965  5 Sheets-Sheet 3

INVENTORS
FRANK D. JONES
GEORGE H. SHRIVER
ROY E. HARRINGTON
BY
John C. Thompson
ATTORNEY

3,417,556
TOBACCO HARVESTER

Frank D. Jones, George H. Shriver, and Roy E. Harrington, Moline, Ill., assignors to Deere & Company, Moline, Ill., a corporation of Delaware
Filed Aug. 20, 1965, Ser. No. 481,229
9 Claims. (Cl. 56—27.5)

ABSTRACT OF THE DISCLOSURE

A drawn tobacco harvester adapted to be secured to a tractor having a conventional three-point hitch. The tobacco harvester has side-by-side defoliating stations and collecting stations. The harvester is supported partially by the three-point hitch of the tractor and also by vertically movable ground-engaging wheel means which are movable with the tractor three-point hitch by the tractor operator. Novel drive means are provided for the defoliating mechanisms, and a novel belt tensioning device is provided.

---

The present invention relates generally to a harvesting device and more particularly to a tobacco harvester in which tobacco leaves are removed by mechanical means from the stalk on which they grow and are then transferred to a leaf discharge or collecting point.

One object of this invention is to provide a tobacco harvester of compact design. Another object of the invention is to provide a tractor drawn tobacco harvester of relatively low cost and of efficient design.

Another object is to provide a tobacco harvester in which the harvester as a whole is vertically adjustable.

Another object is to provide a tobacco harvester having defoliating mechanisms which are vertically adjustable within their housing.

Another object of the present invention is to provide novel tobacco leaf conveying mechanisms which include improved belt tensioning devices. A still further object of the present invention is the provision of improved drive means for driving the belt conveyors and the defoliator drives.

These and other objects and advantages of this invention will be apparent to those skilled in the art after a consideration of the following detailed description, taken in conjunction with the accompanying drawings in which the preferred form of this invention is illustrated.

In the following description right-hand and left-hand reference is determined by standing to the rear of the tobacco harvester and facing the direction of travel.

Figure 1:
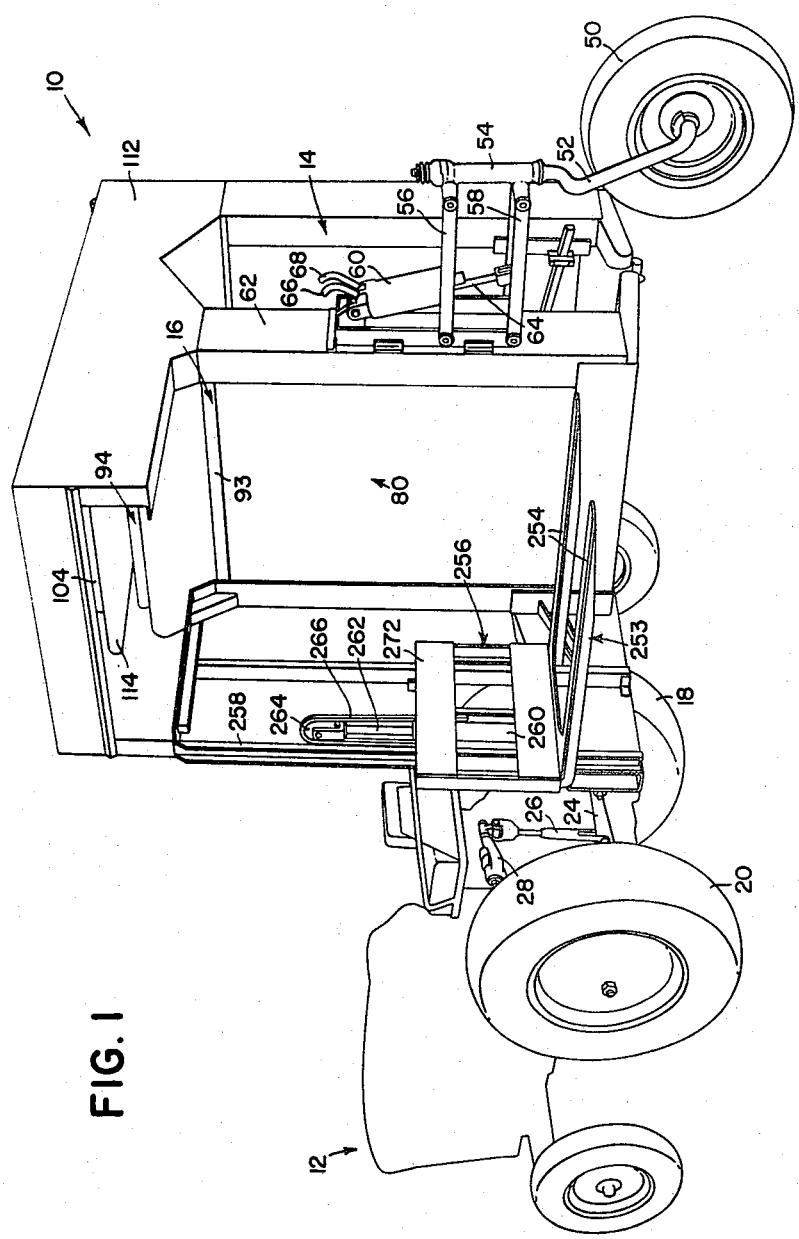
FIG. 1 is a rear left perspective view of a tobacco harvester in which the principles of this invention have been incorporated, the harvester being secured to the lower draft links of a generally conventional farm tractor.
Figure 2:
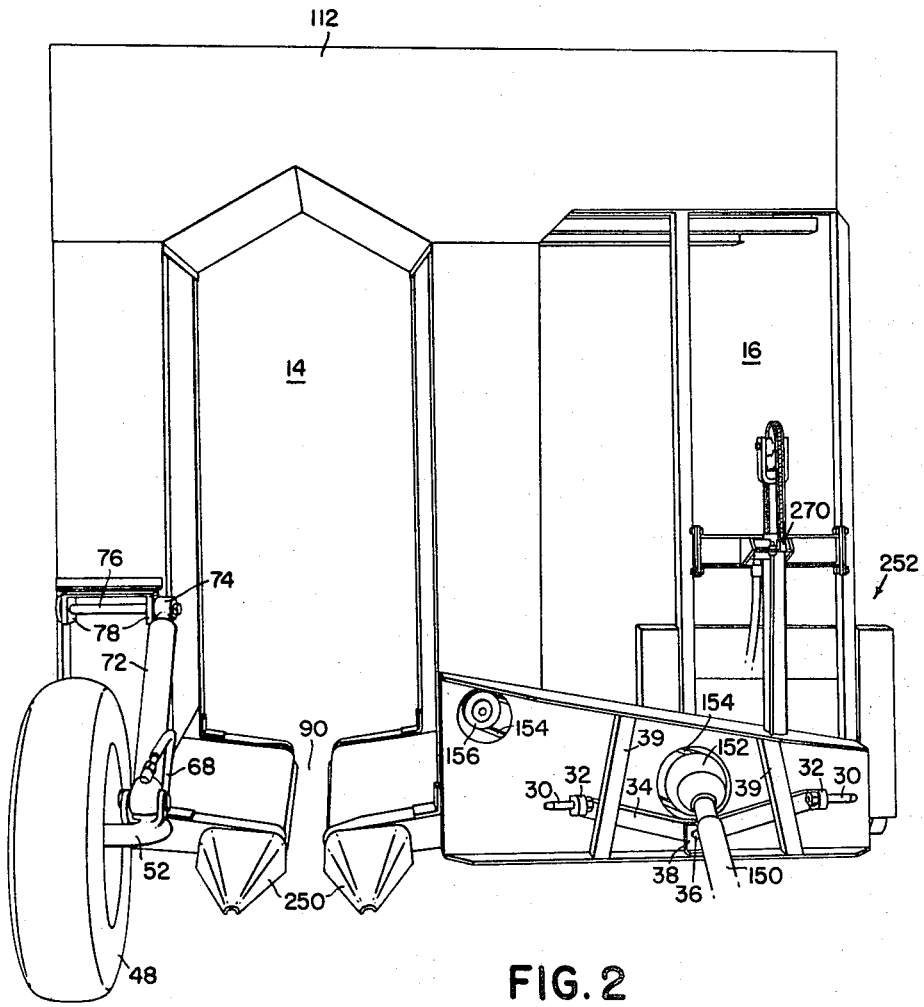
FIG. 2 is a front view of the tobacco harvester shown in FIG. 1.
Figure 3:
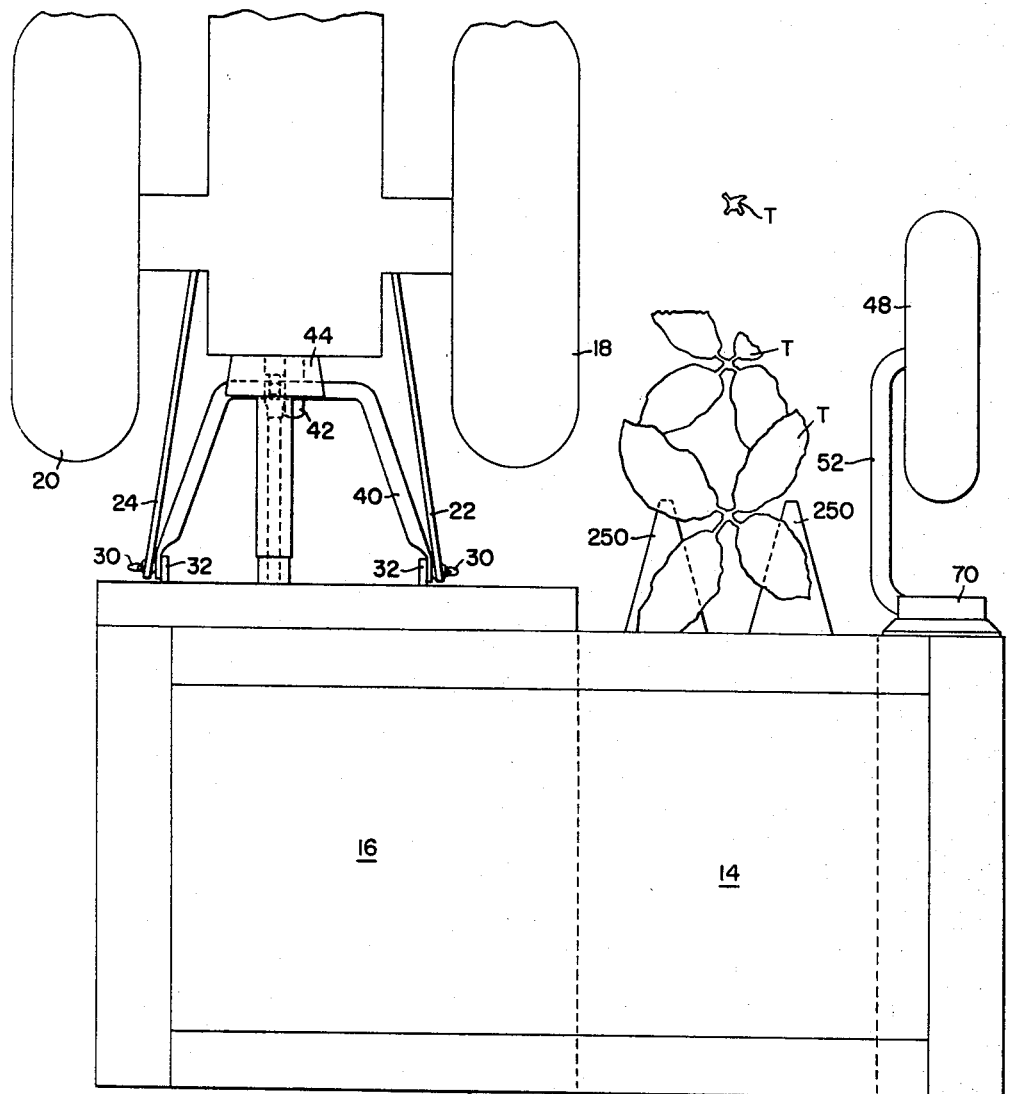
FIG. 3 is a plan view of the tobacco harvester shown in FIGS. 1 and 2 illustrating the manner in which it is supported and is secured to a tractor, the raising and lowering cylinders not being shown.

Referring first to FIG. 1, a tobacco harvester indicated generally at 10 is shown secured to the lower draft links of a conventional farm tractor 12. The tobacco harvester is provided with a defoliating station 14 and a leaf discharge or collecting station 16. The tractor 12 has spaced apart right and left rear wheels 18 and 20 between which the right and left lower draft links 22 and 24 extend. Each lower draft link is pivotally secured at its forward end to the tractor and has secured to a mid-portion a lift link 26 that is supported at its upper end by a rock arm 28 which is in turn secured to a conventional operator-controlled power lift rockshaft on the tractor. Rotation of the rockshaft will cause the rear ends of the draft links 22, 24 to be raised and lowered as is generally conventional. The rear end of the right and left lower draft links are apertured and held about pins 30 (FIGS. 2 and 3) which are rigidly secured to the forwardly extending arms 32 of a member 34 whose middle is apertured and disposed about a pin 36 carried in an upstanding lug 38. To prevent the yoke 34 from moving forwardly, upwardly extending straps 39 are provided that confine the arms of the yoke 34.

A stabilizer yoke 40 is provided which is secured at its bight portion to the drawbar 42 of the tractor, the leg portions of the yoke being apertured at their ends and disposed about the pins 30. The stabilizer yoke 40 in cooperation with the drawbar 42 limits the wandering of the harvester relative to the tractor. Thus, when the harvester is being transported, the drawbar is pinned to the drawbar frame 44 to prevent swinging, and when the harvester is in the field, the pins are so located on the frame 44 that limited swinging of the drawbar is permitted. It should be noted at this point that the draft links 22, 24 are mounted in such a manner that their rear ends may swing laterally with respect to the tractor.

The tobacco harvester is also supported by front and rear wheels 48 and 50 which can be raised and lowered through actuation of hydraulic cylinders. To this end each wheel is supported on an axle arm 52 having a transversely extending portion about which the wheel is rotatably journaled. The rear axle arm 52 is supported within a sleeve member 54 which is carried by upper and lower parallel links 56, 58 respectively. A double acting hydraulic cylinder 60 is secured at one end to the central frame 62 of the tobacco harvester and the piston rod 64 is in turn secured to the lower parallel links 58. The cylinder 60 contains two fluid receiving chambers disposed on opposite sides of a piston, one of the chambers being connected with a tractor-operator controlled source of fluid under pressure on the tractor in a conventional manner by line 66 and as fluid under pressure is introduced into the cylinder 60 through the line 66, the arm 52 and its associated wheel 50 will be forced downwardly, thereby raising the rear end of the tobacco harvester. Venting of the line 66 will permit the tobacco harvester 10 to lower itself by its own weight. The forward axle arm 52 is provided with front and rear transversely extending portions, the forward transversely extending portion having the wheel 48 rotatably disposed about it, and the rear transversely extending portion being disposed within a sleeve member 70 (FIG. 3) carried by a forward wall of the tobacco harvester. A single acting hydraulic cylinder 72 is connected with the double acting hydraulic cylinder 60 by fluid line 68 in such a manner that as fluid is introduced into the cylinder 60 through line 66 on one side of its piston, the fluid on the other side of the piston will be forced out of the cylinder through line 68 which is connected to the single acting cylinder 72, forcing its piston and associated piston rod away from the wheel 48, thereby raising the forward corner of the tobacco harvester. The piston rod of the cylinder 72 is provided with a journal portion 74 that is disposed about a transversely extending pin 76 carried by forwardly extending ears 78 on the front frame of the tobacco harvester.

It can be seen from the foregoing that the tobacco harvester is supported at three points, namely by the lower draft links 22, 24, by the forward wheel 48, and by the rear wheel 50. Raising and lowering of the harvester is controlled simply by raising the rear end of draft links 22, 24 and by introducing fluid into the master double acting hydraulic cylinder 60 which will in turn force fluid into the slave single acting cylinder 72 to raise the tobacco harvester at these points. Lowering of the harvester is accomplished by lowering the lift arms 26 and by venting the fluid from the line 66.

Figure 4:
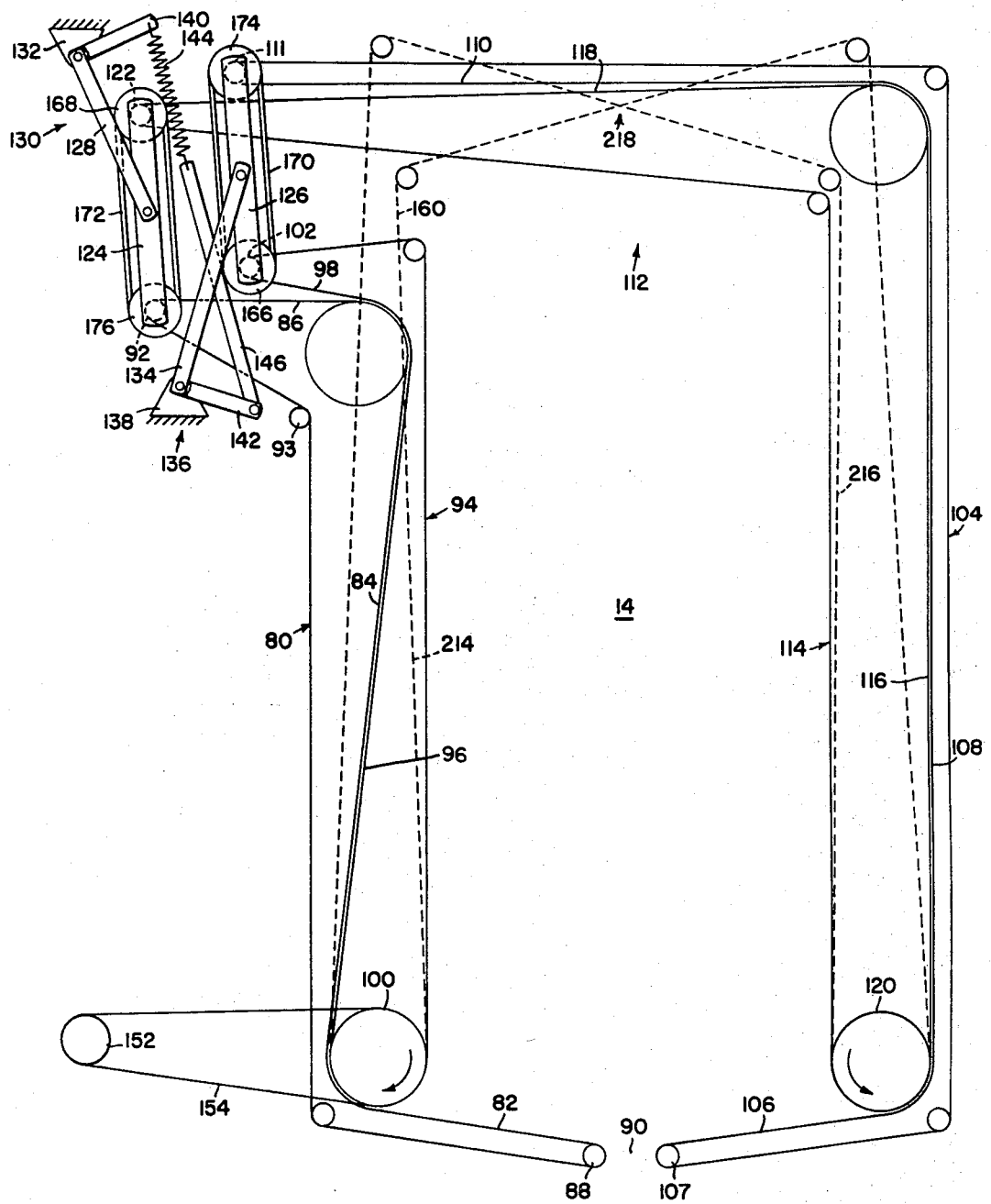
FIG. 4 is a rear diagrammatic view showing the conveyor belts and their associated belt tensioning means, and also showing the associated drive means.

The defoliating station of the harvester is provided with mechanisms such as the type illustrated in U.S. Letters Patents 2,816,411 and 2,834,173 to Wilson; 2,834,174 to Suggs et al; and 3,093,949 to Splinter. These devices remove tobacco leaves from a tobacco stalk by a pulling, striking or cutting action as more fully described in these patents. When the tobacco leaf is severed from its associated stalk, it must be transferred to a collecting station 16. To this end there has been provided a belt conveyor system, which is illustrated in FIG. 4. The belt conveyor system includes two pairs of belts, each pair of belts having one belt having a lower transversely extending portion that receives the tobacco leaves, and a second belt which is associated with the first belt and which is adapted to hold the leaf between it and the first belt to raise the severed leaf to an upper leaf discharge station. Thus the left pair of belts includes a belt 80 having a lower transversely moving flight portion 82 which is adapted to receive leaves from the defoliators, an upwardly moving flight portion 84, and an upper transversely moving flight portion 86. The right-hand end of the belt at its lower flight end is supported by a roller 88 which is disposed adjacent a longitudinally extending opening 90 through which tobacco stalks pass as the tobacco harvester is propelled forwardly over the field. Other rollers are provided as needed, one of these rollers 92 being disposed at the upper left-hand end of the upper transverse flight 86, and another roller 93 supporting the back of the belt. Cooperating with the belt 80 is another belt 94 which has an upwardly moving flight portion 96 and a generally transversely moving flight portion 98. The lower end of the belt 94 is trained about a drive roller 100 and the upper left-hand end of the belt is trained about a roller 102. Other idler rollers may be provided as needed. The right-hand pair of belts is generally similar to the left-hand pair and includes a belt 104 having a lower transversely moving flight portion 106, an upwardly moving flight portion 108, and a transverely moving flight portion 110 which is disposed within the upper arch portion 112 of the tobacco harvester, the arch portion being disposed over the longitudinally extending opening 90 and the defoliating mechanisms disposed within the station 14. The lower end of the belt 104 is disposed about a roller 107 adjacent the opening 90, and the upper end of the belt is disposed about a roller 111 adjacent the discharge end of the upper transverse flight 110. Other rollers are provided as needed. The second belt 114 of the right-hand pair is provided with an upwardly moving flight 116 and a transverse flight 118, the belt being trained about rollers 120 at the lower end and 122 at the upper end.

The belts 80, 94, 104 and 114 are tensioned through rollers 92, 102, 111 and 122. To this end the rollers 92 and 122 are journaled for rotation in front and rear straps 124, only one of the straps being shown in FIG. 4. Similarly rollers 102 and 111 are journaled for rotation in front and rear straps 126. Straps 124 are pivotally carried by the end of arm 128 of bell cranks 130 which are pivotally secured at their midportion to a portion 132 of the tobacco harvester. Strap 126 is pivotally secured at its midportion to the outer end of arm 134 of bell crank 136 which is pivotally secured at its midportion to a portion 138 of the tobacco harvester. Secured to the outer end of the other arms 140, 142 of bell cranks 130, 136 respectively are tensioning means which include a spring 144 and a link 146. As can be seen from FIG. 4, in operation the spring will cause the straps 124, 126 to move to the left, thus tensioning the belts.

The belts 80, 94, 104 and 114 are caused to be driven from the power take-off of the tractor 12; however, it should be noted that if the tractor was not provided with a power take-off, the belts could be driven from another suitable power source, it only being necessary that suitable rotational movement be applied to the drive roller 100. In the embodiment illustrated the power take-off shaft 150 is connected through a universal joint to a sheave 152 mounted on the tobacco harvester above the yoke 34 and in front of the leaf discharge or collecting station 16. A drive belt 154 is disposed about the sheave 152 at one end and about a sheave 156 at the other end, the sheave 156 being concentrically mounted with the roller 100 and adapted to drive it. When the PTO is caused to be rotated, the belt 94 will in turn be caused to rotate.

To rotate the belt 114, an endless flexible drive chain 160 is provided. A portion of the chain 160 is disposed about a concentric sprocket on the rear of the roller 100, and the chain extends upwardly to the upper arch portion 112 of the tobacco harvester and then extends in an outward direction until it is disposed generally above the roller 120 and then extends downwardly and passes about the roller 120. One flight of the chain 160 on each side of the defoliating station 14 is disposed along the surface of the left and right walls 162, 164 as can best be seen in FIG. 5.

Sheaves 166 and 168 are mounted concentrically with rollers 102 and 122, respectively, and are driven thereby. Belts 170 and 172 are journaled over sheaves 166 and 168, respectively and at the other end are journaled over sheaves 174 and 176, respectively. These last two sheaves are mounted concentrically, with rollers 111 and 92, respectively.

In operation when the roller 100 is caused to be rotated, it will in turn cause belt 94 to rotate. Rotation of the belt 94 is used to drive belt 104 through sheave 166, belt 170, and sheave 174. Rotation of roller 100 is also used, as described above, to drive belt 114 through means of the endless flexible chain 160 which drives roller 120. Finally belt 80 is caused to be driven from belt 114 by means of sheave 168, belt 172, and sheave 176. Thus, a relatively simple and efficient drive and tensioning device has been provided for all four conveying belts.

Figure 5:
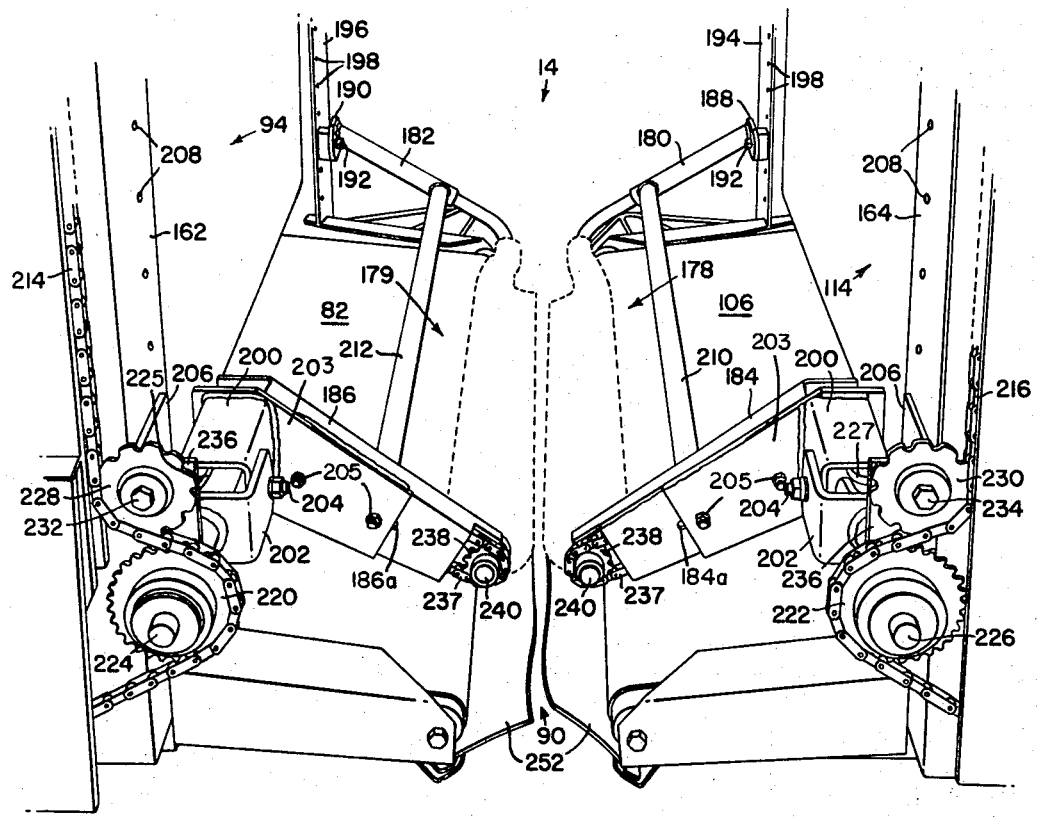
FIG. 5 is a perspective view of a defoliating mechanism showing its manner of attachment to the tobacco harvester of this invention.

In FIG. 5 a defoliating device, which could be of the type described in the Suggs et al. Patent 2,834,174, is shown in phantom, the defoliators being mounted within the defoliating station 14. The forward ends of the defoliators are mounted for rotation on the inner ends of right and left front arms 180 and 182, respectively, and the rear ends of the defoliators are mounted for rotation within the right and left downwardly extending housings 184, 186. The outer ends of the arms 180, 182 are provided with mounting plates 188 and 190 which are suitably apertured to receive bolts 192 which secure the arms 180, 182 to right and left vertically extending rails 194, 196, each of the rails being provided with suitable apertures 198 for the reception of the bolts 192. The housings 184 and 186 are provided at their upper ends with generally longitudinally extending drive shields 200 and journal supports 202, the shields being welded to transversely extending plates 203 which are adjustably secured by means of fasteners 205 to the housings 184 and 186, the fasteners being received within slots 184a and 186a, and the journal support 202 being bolted by means of bolt 204 to the shield 200. A mounting plate 206 is carried by each journal housing 202 and is secured to the right and left walls 164, 162 by bolt means (not shown) which are received within selected apertures 208. The defoliators carried by the arms 180, 182 and housings 184, 186 can be vertically adjusted simply by removing the bolts and sliding the arms and housings up and down to the selected position and reinserting the bolts. Right and left braces 210 and 212 are disposed between the arms 180, 182 and the housings 184, 186 to hold the arms and housings in spaced apart relationships.

In order to drive the defoliating mechanisms which are indicated generally at 178, 179, the chain drive 160 is employed. To this end it should be noted that the roll 100 is rotated in a clockwise direction when viewed from the rear as indicated by the arrow in FIG. 4. Thus, the portion of the chain 214 disposed along the left wall 162 will move in a downwardly direction. The chain portion 216 that moves along the right wall 164 will also be caused to move downwardly by crossing the chain as at 218 in the upper arch of the tobacco harvester. The left and right chain portions 214 and 216 are disposed over sprockets 220, 222, respectively, which are fixed to rotate with shafts 224, 226. The chains 214, 216 are held in engagement with the sprockets 220, 222 by means of idler sprockets 228, 230 which are journaled for rotation on bolts 232, 234 which are fixed to an inwardly extending flange portion 236 of the mounting plates 206. The shafts 224, 226 are journaled within the journal housing 202 and extend through the shield 200 and terminate within the housings 186, 184. Each shaft is provided with a universal joint (225 or 227) in alignment with pivot bolt 204 to permit angling the front end of the defoliator frame upwardly or downwardly. Disposed about the terminal end of the shafts 224, 226 are sprockets (not shown) about which are disposed chains 237 that are disposed at their other end over sprockets 238 which are secured to one end of shafts 240 about which the defoliator members rotate. The chains 237 are tensioned by means of the adjustable connection between the housings 184, 186 and plates 203.

The operation of applicants' tobacco harvester is as follows: The tobacco harvester 10 is secured to the lower draft links 22, 24 of the tractor by means of pins 30. The tractor is then caused to be propelled forwardly down the field with the defoliating station 14 in line with a row of tobacco plants T. As the harvester 10 is propelled forwardly, the triangularly shaped guides 250 will engage the lower leaves and/or those stalks of the tobacco plant which are not in a line with the others and feed them within the defoliating station 14. As the stalks pass through the longitudinal opening 90, the defoliating mechanisms 178, 179 will cause the leaves to be removed from the stalks in the manner fully set forth in the foregoing patents. As the leaves fall, they will engage the flight portions 82 or 106 of the belts 80, 104, respectively and be carried away from the opening 90. At this point it should be noted that the opening 90 is provided with inwardly extending rubber flaps 252 (FIG. 5) which prevent the leaves from passing down to the ground through the opening 90. The leaves which have been "primed" from the tobacco stalk will move between the roller 100 or 120 and the associated belt 82 or 106 and then be carried upwardly between the two belts 84, 96 or 116, 108. After the leaves have been carried upwardly, they will then be carried to the left on the flight portions 86 or 118 where they will then be discharged.

As the leaves are discharged, they are received in a container (not shown) which may, in its simplest form, be simply a large box which will be taken to the warehouse so that the leaves may be subsequently assembled into hands and placed on sticks for curing, or in the alternative the container may contain bulk curing racks as are well known in the trade. In either event the container is preferably carried on a vertically movable platform such as a fork lift 253 to permit the carrier to be held in a raised position during harvesting and yet permit it to be lowered onto the ground when it is desired to remove the container from the harvester. The fork lift 253 is provided with rearwardly extending members 254 which are secured at their forward end to a generally vertically extending frame 256 which is provided with suitable guides and is adapted to engage vertically extending rails 258. The fork lift is caused to be raised and lowered by means of a cylinder 260 which has an upwardly extending piston rod 262 about which is disposed at its upper end a pulley 264 over which is trained a chain 266. One end of the chain is anchored as at 270 while the other end is secured to an upper cross member 272 of the vertical frame 256. As fluid is introduced into the cylinder 260, the piston rod will be extended and the chain 266 will cause the frame 256 of the fork lift 253 to be raised. Venting of the fluid from the cylinder 260 will permit the weight of the fork lift to cause itself to lower.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. The combination of a tractor having spaced apart rear wheels and tractor-operator-controlled power lift means including a pair of lower draft links secured at their forward ends to the tractor and a generally transversely extending tobacco harvester having side-by-side tobacco leaf defoliating and collecting stations, the tobacco leaf defoliating station including transversely spaced apart supporting means to which defoliating mechanisms are secured, the tobacco harvester being secured at its forward end to the rear of the lower draft links with the defoliating station disposed outwardly to one side and to the rear of one of the tractor rear wheels and the collecting station being disposed behind and between the rear tractor wheels, the tobacco harvester further including conveying means disposed between said defoliating station and said collecting station to transfer tobacco leaves from the defoliating station to the collecting station, first vertically movable ground engaging wheel means carried by a forward portion of said harvester and to said one side of the tractor rear wheels, second verticaly movable ground engaging wheel means carried by the rear of the harvester, and second tractor-operator-controlled means operable from the tractor to raise and lower said first and second wheel means simultaneously with operator-control of the tractor power lift means whereby the height of the defoliating mechanisms may be varied.

2. The invention set forth in claim 1 in which said means operable to raise and lower said first and second wheel means includes a double acting hydraulic cylinder having two fluid receiving chambers disposed on opposite sides of a piston and operable to move one of said wheel means downwardly when fluid is introduced into one of said fluid receiving chambers, a single acting hydraulic cylinder operable to move the other of said wheel means downwardly in response to introduction of fluid into said one chamber of said cylinder, and fluid line means interconnecting the single acting hydraulic cylinder with the other of said fluid receiving chambers whereby the first and second wheel means will be forced downwardly as fluid is introduced into said fluid receiving chamber.

3. In a tobacco harvester having first and second pairs of tobacco leaf conveyor belts, each pair of belts having a receiving end and a discharge end, the discharge end of the first pair being disposed above the discharge end of the second pair of belts, the combination therewith of means to tension all of said belts comprising first and sec- of said first pair of belts, third and fourth belt carrying rolls cooperable with the discharge ends of the second pair of belts, first means interconnecting the ends of the first and third belt carrying rolls and holding them a fixed distance from each other, second means interconnecting the ends of said second and fourth belt carrying rolls and holding them a fixed distance from each other, and means mounted on the frame of the tobacco harvester and interconnecting the first and second means to bias them in a direction to place all of said belts under tension.

4. The invention set forth in claim 3 in which said last mentioned means includes first and second bell cranks pivotally supported on said tobacco harvester, one end of the first bell crank pivotally carrying the midportion of said first interconnecting means and one end of the second bell crank pivotally carrying the midportion of said second interconnecting means, and means interconnecting the other ends of said bell cranks to bias the first and second interconnecting means in the same direction to place the belts under tension.

5. A tobacco harvester adapted to be propelled forwardly over the ground to remove tobacco leaves from tobacco stalks comprising: a defoliating station, a discharge station, first and second pairs of transversely and vertically movable belts adapted to carry tobcco leaves from the defoliating station to the discharge station, each of said pairs of belts having a first belt having a lower transversely moving flight portion adapted to receive leaves at the defoliating station, an upwardly moving flight portion, and an upper transversely moving flight portion, the end of the upper transverse flight which is remote from the upwardly moving flight being disposed over a first roller and a second belt having an upwardly moving flight portion and an upper transversely moving flight portion, the end of the transverse flight which is remote from the upwardly moving flight portion being disposed over a second roller, the upwardly moving flight portions being disposed relatively closely adjacent each other whereby tobacco leaves may be held and conveyed within the confines of the upwardly moving flight portions and belt tensioning means comprising first strap means interconnecting the ends of said first roller of one pair with the second roller of the other pair to hold said rollers a fixed distance apart, and second strap means interconnecting the ends of the second roller of said one pair and the first roller of said other pair to hold them a fixed distance apart, and means mounted on the frame of the tobacco harvester and interconnecting the first and second strap means to bias them in a direction away from said upwardly moving flight portions.

6. A tobacco harvester adapted to be propelled forwardly over the ground to remove tobacco leaves from tobacco stalks comprising: a defoliating station having an upper arch portion and spaced apart side walls to which defoliators may be adjustably secured, a leaf discharge station, first and second pairs of transversely and vertically moving belts adapted to carry tobacco leaves from the defoliating station to the discharge station, each of said pairs of belts having a first belt having a lower transversely moving flight portion adapted to receive leaves at the defoliating station, an upwardly moving flight portion, and an upper transversely moving flight portion, the end of the upper transverse flight which is remote from the upwardly moving flight being disposed over a first roller and a second belt having an upwardly moving flight portion whose lower end is disposed over a drive roller and an upper transversely moving flight portion, the end of the transversely moving flight portion remote from the upwardly moving flight portion being disposed over a second roller, the upwardly moving flight portions being disposed relatively closely adjacent each other whereby tobacco leaves may be held and conveyed within the confines of the upwardly moving flight portions, and means to drive all of said belts including a drive means drivingly interconnected with the drive roller of the second belt of one of said pairs, endless flexible drive means interconnecting the drive roller of the second belt of said one pair with the drive roller of the second belt of the other of said pairs, whereby the second belt of the other pair of belts is driven when the second belt of the first pair is driven, power transmitting means interconnecting the second roller of each of said second belts with the first roller of each of said first belts whereby the first belts are caused to be driven when said second belts are driven.

7. The invention set forth in claim 6 in which said endless flexible drive means is crossed in the upper arch portion.

8. The invention set forth in claim 6 in which said endless flexible drive means comprises a single drive chain having flight portions disposed along the inner surfaces of the spaced apart side walls whereby the adjustable defoliators may contact said drives and be driven thereby.

9. A tobacco harvester including a defoliator station having a pair of spaced apart vertically extending side walls disposed to either side of a central longitudinally extending opening through which a row of plants may be received during harvesting, conveying means and a defoliator carried by each of said side walls, each conveyor means including belt means journaled about longitudinally extending roller means, one of said roller means being disposed adjacent the bottom of the associated side wall, and drive chain means engageable with said one roller means, said drive chain means including a vertically extending flight disposed alongside the associated side wall, and each defoliator including mounting means which may be vertically adjustably secured to the associated side wall and a drive sprocket on said mounting means which is disposed in driven relationship with the conveyor drive chain flight disposed alongside the associated side wall.

References Cited

UNITED STATES PATENTS

| | | | |
|---|---|---|---|
| 2,014,447 | 9/1935 | Needham | 198—165 |
| 2,314,041 | 3/1943 | Gurries | 172—413 |
| 2,836,950 | 6/1958 | Anderson | 56—27.5 |
| 2,940,615 | 6/1960 | Long et al. | 56—27.5 |
| 3,083,517 | 4/1963 | Wilson | 56—27.5 |
| 3,229,831 | 1/1966 | Long | 56—27.5 |

ABRAHAM G. STONE, *Primary Examiner.*

PASQUALE A. RAZZANO, *Assistant Examiner.*

PO-1050
(5/69)

UNITED STATES PATENT OFFICE
CERTIFICATE OF CORRECTION

Patent No. 3,417,556        Dated 24 December 1968

Inventor(s) Frank D. Jones, George H. Shriver and Roy E. Harring

It is certified that error appears in the above-identified patent and that said Letters Patent are hereby corrected as shown below:

Column 6, line 36, change "verticaly" to -- vertically --
line 62, after "sec-" insert -- ond belt carrying rolls cooperable with the discharge ends --.

SIGNED AND
SEALED

OCT 21 1969

(SEAL)
Attest:

Edward M. Fletcher, Jr.              WILLIAM E. SCHUYLER, JR.
Attesting Officer                  Commissioner of Patents